(12) United States Patent
Santosuosso et al.

(10) Patent No.: US 11,182,145 B2
(45) Date of Patent: Nov. 23, 2021

(54) OPTIMIZING UPDATES TO DISTRIBUTED DATA PROCESSING APPLICATIONS

(71) Applicant: International Business Machines Corporation, Armonk, NY (US)

(72) Inventors: John M. Santosuosso, Rochester, MN (US); David M. Koster, Reston, VA (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 16/354,868

(22) Filed: Mar. 15, 2019

(65) Prior Publication Data

US 2020/0293299 A1 Sep. 17, 2020

(51) Int. Cl.
*G06F 8/65* (2018.01)
*G06F 8/41* (2018.01)

(52) U.S. Cl.
CPC . *G06F 8/65* (2013.01); *G06F 8/41* (2013.01)

(58) Field of Classification Search
CPC .......... G06F 8/40–41; G06F 8/41; G06F 8/48; G06F 8/65–71
See application file for complete search history.

(56) References Cited

U.S. PATENT DOCUMENTS 5,579,520 A 11/1996 Bennett
5,854,932 A 12/1998 Mariani
6,966,058 B2 * 11/2005 Earl ........................ G06F 8/65
709/223
9,342,276 B1 * 5/2016 Lin ........................ G06F 8/34
(Continued)

OTHER PUBLICATIONS

Liang et al., "MON: On-demand Overlays for Distributed System Management", published by USENIX Worlds '05, pp. 1-9, [retrieved online https://www.usenix.org/legacy/event/worlds05/tech/full_papers/liang/liang_html/ on Aug. 12, 2021] (Year: 2005).*

(Continued)

*Primary Examiner* — S. Sough
*Assistant Examiner* — Zheng Wei
(74) *Attorney, Agent, or Firm* — Bryan D. Wells; Brian M. Restauro

(57) ABSTRACT

Techniques for optimizing updates to a distributed data processing application are provided. A runtime engine compares a first version of a distributed application to a second, new version of the distributed application. The runtime engine identifies change(s) to the first version. The runtime engine generates compiler hint(s) for the change(s). The second version of the distributed application and compiler hint(s) are sent to a compiler. The runtime engine receives, from the compiler, a compiled second version of the distributed application and compiler-scheduler hint(s) describing respective optimizations the compiler made to the compiled second version of the distributed application based on the change(s) made to the first version of the distributed application and the compiler hint(s). The runtime engine optimizes an update by overlaying the change(s) made to the first version of the distributed application based on the compiler-scheduler hint(s) and the compiled second version of the distributed application.

20 Claims, 7 Drawing Sheets

(56) References Cited

U.S. PATENT DOCUMENTS

| | | | |
|---|---|---|---|
| 9,600,256 B2* | 3/2017 | Aggag | G06F 8/48 |
| 10,146,515 B1* | 12/2018 | Sundresh | G06F 8/41 |
| 2015/0355898 A1* | 12/2015 | Zhang | G06F 8/656 |
| | | | 717/169 |
| 2016/0283221 A1 | 9/2016 | Kochar | |
| 2017/0147324 A1* | 5/2017 | Weber | G06F 8/656 |
| 2017/0223075 A1 | 8/2017 | Hong | |
| 2017/0286099 A1* | 10/2017 | Wilkinson | G06F 8/71 |
| 2018/0052678 A1 | 2/2018 | Chigurapati | |
| 2018/0081676 A1 | 3/2018 | Lindholm | |
| 2019/0243629 A1* | 8/2019 | Gass | G06F 8/64 |

OTHER PUBLICATIONS

Segal et al., "On-The-Fly Program Modification: Systems For Dynamic Updating", published by IEEE software, pp. 53-65 (Year: 1993).*

"Compiler Hints", © 2010, Oracle Corporation and/or its affiliates, 5 pages, <https://docs.oracle.com/cd/E19059-01/wrkshp50/805-4947/6j4m8jrmv/index.html>.

"Using the GNU Compiler Collection (GCC): Optimize Options", printed on Oct. 29, 2018, 67 pages, <https://gcc.gnu.org/onlinedocs/gcc/Optimize-Options.html>.

Bechtold et al., "JUnit 5 User Guide", Version 5.4.0, Last updated Jan. 27, 2019, 113 pages, <https://junit.org/junit5/docs/current/user-guide/>.

Brais, Hadi, "Compilers—What Every Programmer Should Know About Compiler Optimizations", Feb. 2015, vol. 30, No. 2, 14 pages, <https://msdn.microsoft.com/en-US/magazine/dn904673.aspx>.

Mell et al., "The NIST Definition of Cloud Computing", National Institute of Standards and Technology, Special Publication 800-145, Sep. 2011, 7 pages.

Orso et al., "A Technique for Dynamic Updating of Java Software*", printed on Oct. 29, 2018, 10 pages, <https://homes.cs.washington.edu/~anuprao/pubs/icsm02_dusc.pdf>.

* cited by examiner

OPTIMIZING UPDATES TO DISTRIBUTED DATA PROCESSING APPLICATIONS

TECHNICAL FIELD

The present invention relates generally to the field of data processing and, more particularly, to optimizing updates to distributed data processing applications.

BACKGROUND

Modern computer technology generates large amounts of data. Various techniques have emerged to process this data. For example, batch processing, stream processing, and real-time processing are three types of data processing systems that are differentiated by how data is ingested. In batch processing, data is generally collected and stored over a period of time and processed at regular intervals or on demand. While batch processing provides control over when data processing occurs, batch processing can require significant infrastructure to store large amounts of data prior to processing. In both stream processing and real-time processing, data processing occurs continuously, or nearly continuously, on a stream of data as opposed to in discrete intervals as in batch processing. Both stream processing and real-time processing can be useful when data is generated continuously or by a large number of events occurring close in time, but real-time processing requires that the system provide an output, or "reaction," within a narrow window of time, typically within milliseconds of ingestion. In general, a stream processing system or real-time processing system must, over time, have a data output rate that meets or exceeds its data input rate to prevent storage and/or memory overflows.

SUMMARY

According to one embodiment of the present invention, a method for optimizing updates to a distributed data processing application is provided. The method includes: comparing, by a runtime engine, a first version of a distributed application to a second version of the distributed application, the second version representing a new version of the distributed application; identifying in the second version of the distributed application, by the runtime engine, one or more changes made to the first version of the distributed application; generating, by the runtime engine, one or more compiler hints for at least one change, each compiler hint describing an aspect of a respective change; sending, by the runtime engine, the second version of the distributed application and the one or more compiler hints to a compiler; receiving from the compiler, by the runtime engine, a compiled second version of the distributed application and at least one compiler-scheduler hint, each compiler-scheduler hint describing a respective optimization made by the compiler to the compiled second version of the distributed application based, at least in part, on the one or more changes made to the first version of the distributed application and the one or more compiler hints; and overlaying, by the runtime engine, the one or more changes made to the first version of the distributed application based, at least in part, on the at least one compiler-scheduler hint and the compiled second version of the distributed application.

According to another embodiment of the present invention, a computer program product for optimizing updates to a distributed data processing application is provided. The computer program product comprises a computer readable storage medium and program instructions stored on the computer readable storage medium. The program instructions include: program instructions to compare, by a runtime engine, a first version of a distributed application to a second version of the distributed application, the second version representing a new version of the distributed application; program instructions to identify in the second version of the distributed application, by the runtime engine, one or more changes made to the first version of the distributed application; program instructions to generate, by the runtime engine, one or more compiler hints for at least one change, each compiler hint describing an aspect of a respective change; program instructions to send, by the runtime engine, the second version of the distributed application and the one or more compiler hints to a compiler; program instruction to receive from the compiler, by the runtime engine, a compiled second version of the distributed application and at least one compiler-scheduler hint, each compiler-scheduler hint describing a respective optimization made by the compiler to the compiled second version of the distributed application based, at least in part, on the one or more changes made to the first version of the distributed application and the one or more compiler hints; and program instructions to overlay, by the runtime engine, the one or more changes made to the first version of the distributed application based, at least in part, on the at least one compiler-scheduler hint and the compiled second version of the distributed application.

According to another embodiment of the present invention, a computer system for optimizing updates to a distributed data processing application is provided. The computer system includes one or more computer processors, one or more computer readable storage media, and program instructions stored on the computer readable storage media for execution by at least one of the one or more processors. The program instructions include: program instructions to compare, by a runtime engine, a first version of a distributed application to a second version of the distributed application, the second version representing a new version of the distributed application; program instructions to identify in the second version of the distributed application, by the runtime engine, one or more changes made to the first version of the distributed application; program instructions to generate, by the runtime engine, one or more compiler hints for at least one change, each compiler hint describing an aspect of a respective change; program instructions to send, by the runtime engine, the second version of the distributed application and the one or more compiler hints to a compiler; program instruction to receive from the compiler, by the runtime engine, a compiled second version of the distributed application and at least one compiler-scheduler hint, each compiler-scheduler hint describing a respective optimization made by the compiler to the compiled second version of the distributed application based, at least in part, on the one or more changes made to the first version of the distributed application and the one or more compiler hints; and program instructions to overlay, by the runtime engine, the one or more changes made to the first version of the distributed application based, at least in part, on the at least one compiler-scheduler hint and the compiled second version of the distributed application.

DETAILED DESCRIPTION

Figure 1:
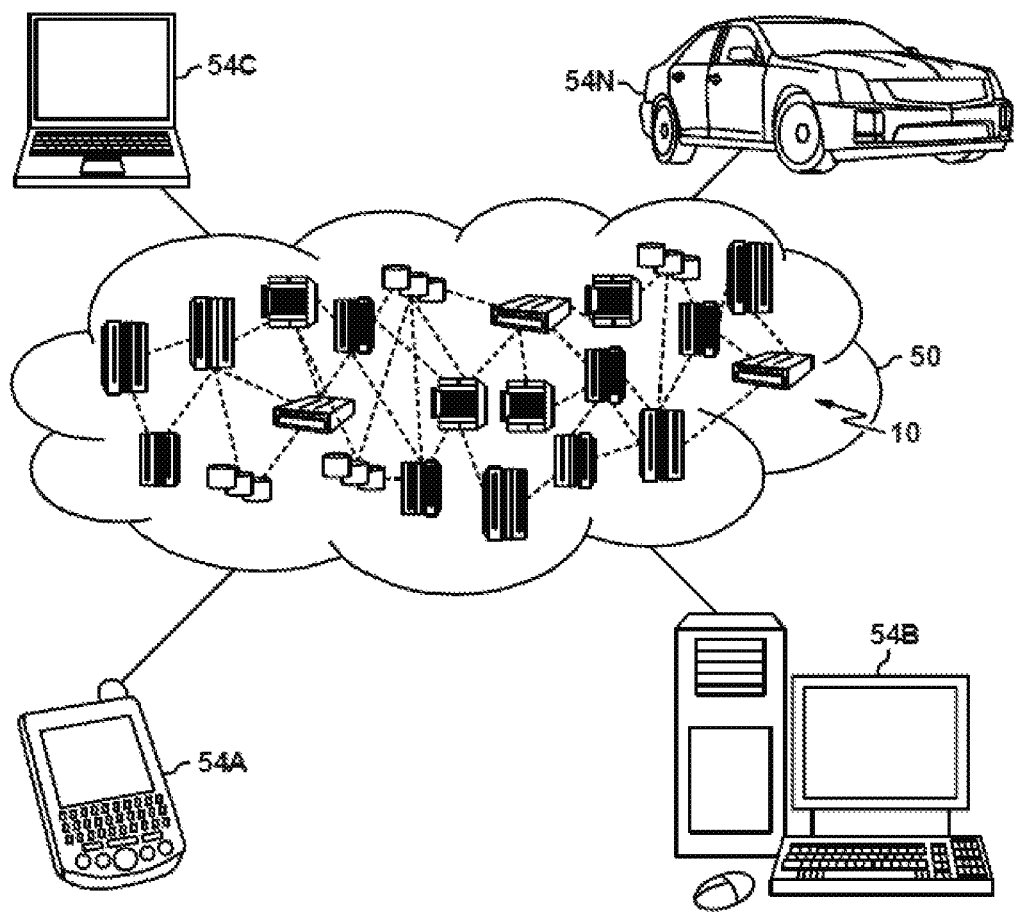
FIG. 1 depicts a cloud computing environment according to an embodiment of the present invention.

Embodiments of the present invention recognize that updating data processing applications executing in real-time or near real-time data processing environments often results in down time so that any modified elements can restart and so that the application reinitialize. This initiation time, however, can jeopardize service level agreement (SLA) uptime provisions, increase requirements for memory and/or storage to store data generated during the initiation time, and otherwise disrupt the flow of data through the system, which may have a cascading effect. For example, down time can be particularly costly with respect to applications executing in cloud environments and security applications. Embodiments of the present invention further recognize that (i) many modifications to data processing applications executing in real-time or near real-time data processing environments are small and affect only a subset of operations, and (ii) in a distributed data processing application, operations may execute on various nodes such that operations of some nodes can continue to execute while operations on other nodes restart to implement modifications. Accordingly, embodiments of the present invention realize a reduction in downtime when modifications are made to a distributed data processing application by optimizing the modifications such that the modifications minimize the number of nodes that must restart to affect the modifications, as described in greater detail herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Embodiments of the present invention will now be described in detail with reference to the Figures. It is to be understood that these embodiments are described only for the purpose of illustration and help those skilled in the art to understand and implement the present invention, without suggesting any limitation as to the scope of the invention. The invention described herein can be implemented in various manners other than the ones explicitly described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
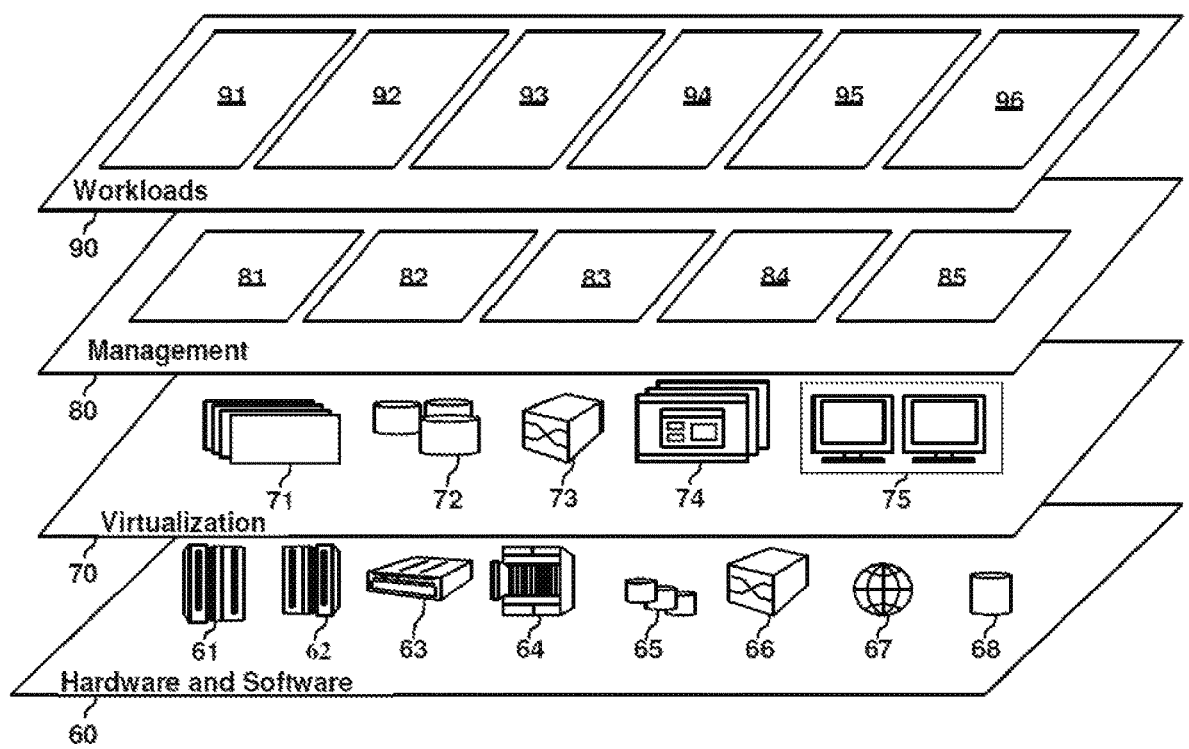
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload optimization 96. In various embodiments, workload optimization 96 represents logic for optimizing updates to a distributed application executing in cloud computing environment 50, as described in greater detail with respect to FIGS. 4-7.

Figure 3:
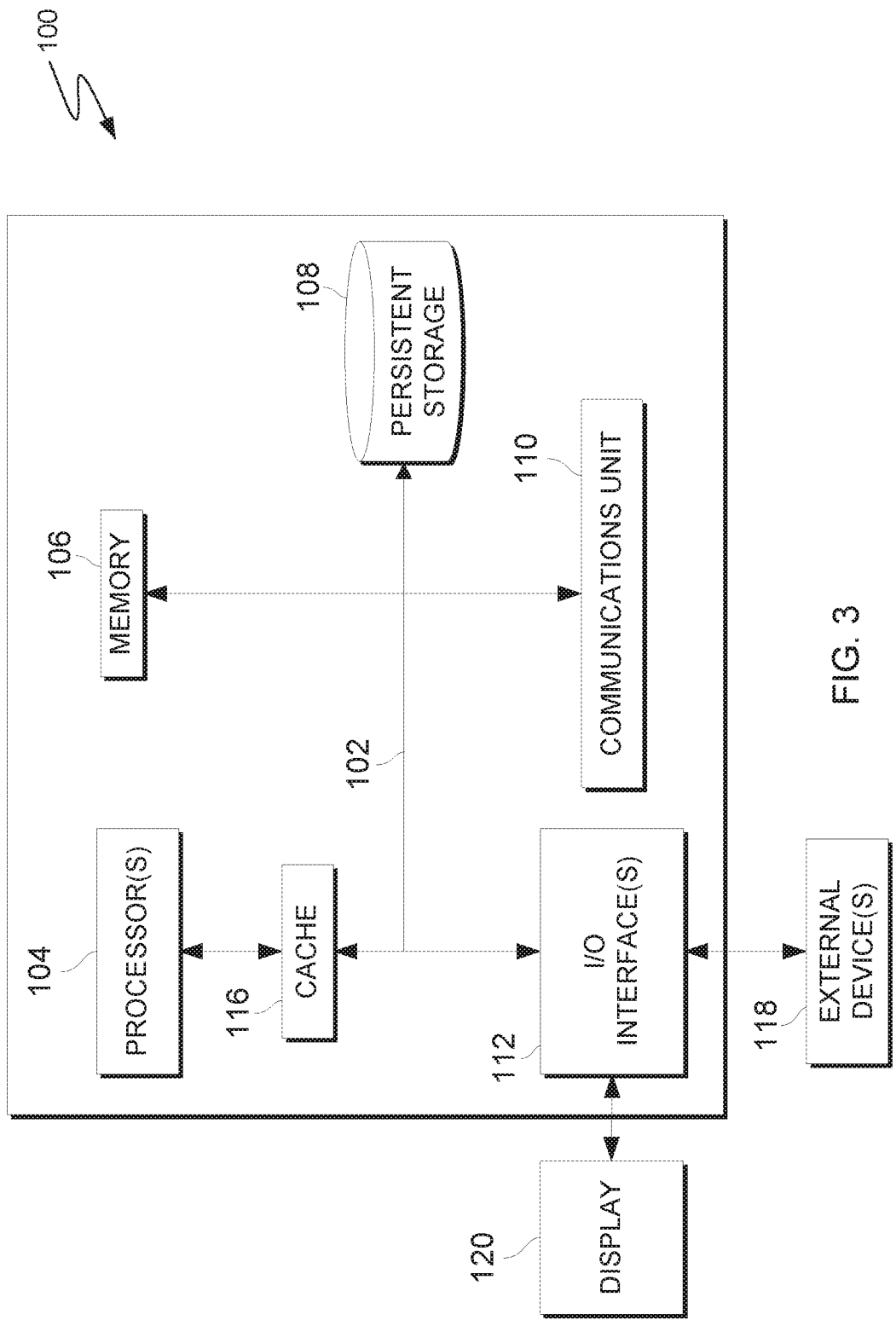
FIG. 3 is a functional block diagram illustrating a computing system, in accordance with an embodiment of the present invention.

FIG. 3 is a block diagram of components of a computing device, generally designated 100, in accordance with an embodiment of the present invention. In various embodiments, an instance of computing device 100 is representative of any respective node of computing nodes 10 within cloud computing environment 50 of FIG. 1 and/or computing device within hardware and software layer 60 of FIG. 2. Instances of computing device 100 can also respectively represent any of the nodes depicted with respect to FIG. 4 and execute any logic and/or program instructions attributed thereto.

It should be appreciated that FIG. 3 provides only an illustration of one implementation and does not imply any limitations with regard to the environments in which different embodiments may be implemented. Many modifications to the depicted environment may be made.

Computing system 100 includes processor(s) 102, cache 106, memory 104, persistent storage 110, input/output (I/O) interface(s) 112, communications unit 114, and communications fabric 108. Communications fabric 108 provides communications between cache 106, memory 104, persistent storage 110, communications unit 114, and input/output (I/O) interface(s) 112. Communications fabric 108 can be implemented with any architecture designed for passing data and/or control information between processors (such as microprocessors, communications and network processors, etc.), system memory, peripheral devices, and any other hardware components within a system. For example, communications fabric 108 can be implemented with one or more buses or a crossbar switch.

Memory 104 and persistent storage 110 are computer readable storage media. In this embodiment, memory 104 includes random access memory (RAM). In general, memory 104 can include any suitable volatile or non-volatile computer readable storage media. Cache 106 is a fast memory that enhances the performance of processor(s) 102 by holding recently accessed data, and data near recently accessed data, from memory 104.

Program instructions and data used to practice embodiments of the present invention may be stored in persistent storage 110 and in memory 104 for execution by one or more of the respective processor(s) 102 via cache 106. In an embodiment, persistent storage 110 includes a magnetic hard disk drive. Alternatively, or in addition to a magnetic hard disk drive, persistent storage 110 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 110 may also be removable. For example, a removable hard drive may be used for persistent storage 110. Other examples include optical and magnetic disks, thumb drives, and smart cards that are inserted into a drive for transfer onto another computer readable storage medium that is also part of persistent storage 110.

Communications unit 114, in these examples, provides for communications with other data processing systems or devices. In these examples, communications unit 114 includes one or more network interface cards. Communications unit 114 may provide communications through the use of either or both physical and wireless communications links. Program instructions and data used to practice embodiments of the present invention may be downloaded to persistent storage 110 through communications unit 114.

I/O interface(s) 112 allows for input and output of data with other devices that may be connected to computer system 100. For example, I/O interface(s) 112 may provide a connection to external device(s) 116 such as a keyboard, keypad, a touch screen, and/or some other suitable input device. External device(s) 116 can also include portable computer readable storage media such as, for example, thumb drives, portable optical or magnetic disks, and memory cards. Software and data used to practice embodiments of the present invention can be stored on such portable computer readable storage media and can be loaded onto persistent storage 110 via I/O interface(s) 112. I/O interface(s) 112 also connect to display 118.

Display 118 provides a mechanism to display or present data to a user and may be, for example, a computer monitor.

Figure 4:
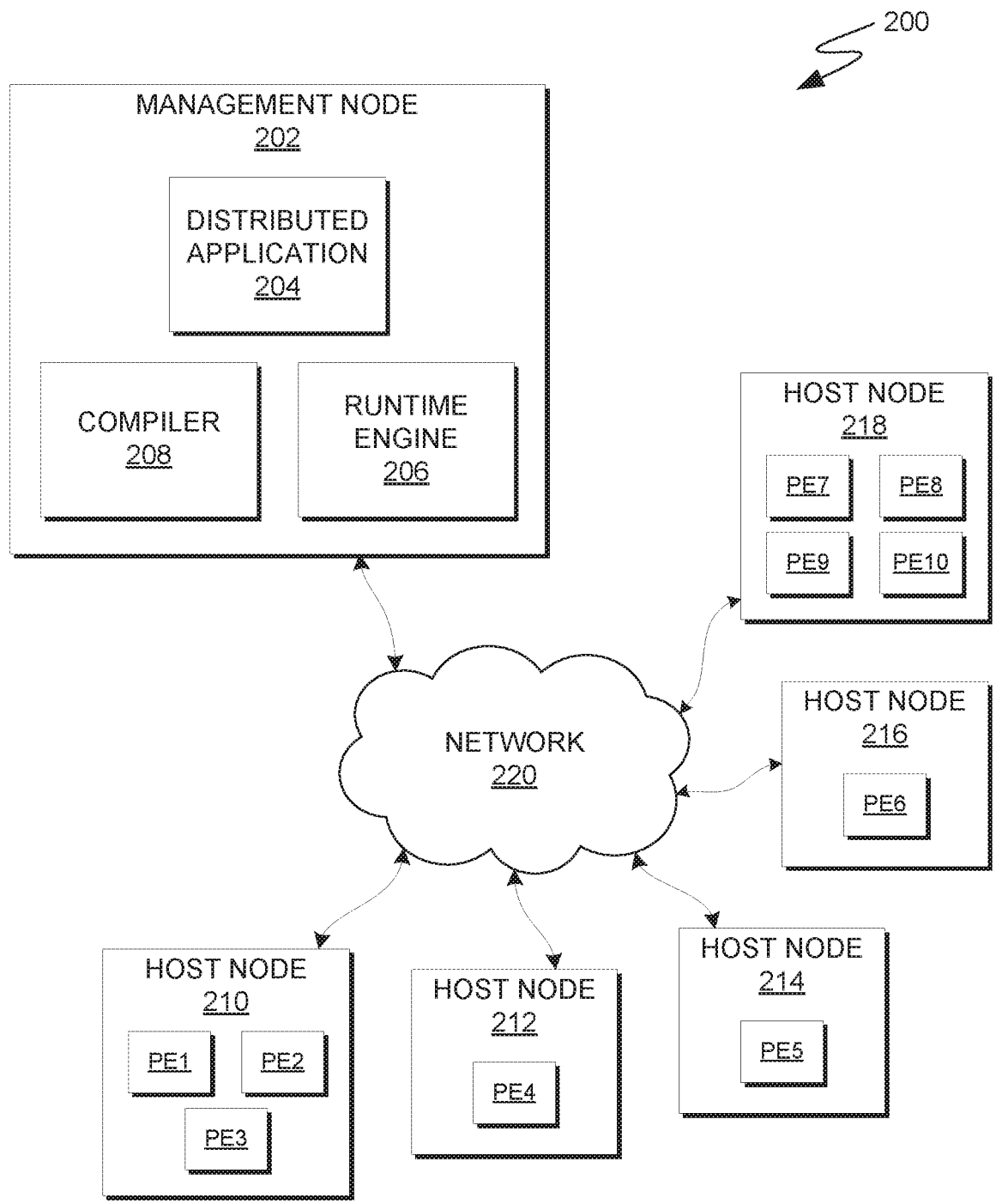
FIG. 4 is a functional block diagram illustrating a distributed computing environment in which a distributed data processing application is executing, in accordance with an embodiment of the present invention.

FIG. 4 is a functional block diagram illustrating a computing environment, in accordance with an embodiment of the present invention. For example, FIG. 4 is a functional block diagram illustrating computing environment 200. Computing environment 200 includes management node 202, host node 210, host node 212, host node 214, host node 216, and host node 218 that are connected over network 220. In general, computing environment 200 represents a computing environment in which a distributed data processing application is executing on a plurality of host nodes and managed via a management node.

In the embodiment depicted in FIG. 4, management node 202 includes distributed application 204, runtime engine 206, and compiler 208. In various embodiments, management node 202 is a computing device that can be a stand-alone device, a server, a laptop computer, a tablet computer, a netbook computer, a personal computer (PC), or a desktop computer. In another embodiment, management node 202 represents a computing system utilizing clustered computers and components to act as a single pool of seamless resources. In yet other embodiments, management node 202 represents a virtual machine provisioned to provide the functionality attributed to it. In general, management node 202 represents any collection of resources for deploying and managing distributed application 204 within computing environment 200 via, at least in part, runtime engine 206 and compiler 208. Management node 202 can include or utilize internal and external hardware components, as depicted and described in further detail with respect to FIG. 3.

In various embodiments, management node 202 can include or have access to one or more data repositories (not shown) that may be written to and read by one or both of runtime engine 206 and compiler 208. In some embodiments, such database(s) may be written to and read by programs and entities outside of computing environment 200 in order to populate the repository with data (e.g., distributed application 204, data representing computing resources within computing environment 200, or various computer libraries, etc.). Management node 202 can, in various embodiment, also include or have access to a user interface (UI), not shown, that operates to provide a UI (e.g., a graphical user interface (GUI)) that permits a user (e.g., a system administrator) to modify distributed application 204 or otherwise manage computer resources within computing environment 200.

In various embodiments, distributed application 204 is a real-time or near real-time data processing application having code that can execute on a plurality of computing nodes. For illustrative simplicity, the present disclosure will describe distributed application 204 with respect to a streaming data processing environment in which distributed application 204 includes a plurality of processing elements. Embodiments of the present invention, however, are not to be construed as being limited to streaming, real-time, or near real-time data processing environments. More specifically in the embodiment depicted in FIG. 4, distributed application 204 includes ten processing elements (PEs). As used herein, a processing element refers to a computer process containing one or more operators, wherein an operator is a functional piece of code that acts on data. In FIG. 4, PE1-PE10 represent processing elements of distributed application 204 that are deployed on respective computing nodes within computing environment 200 (i.e., host nodes 210, 212, 214, 216, and 218). In operation, distributed application 204 is executed via PE1-PE10 on host nodes that store at least the respective portions of distributed application 204. In FIG. 4, distributed application 204 is depicted as residing on management node 202 to represent distributed application 204 as it is received by management node 202 prior to deployment on host nodes 210, 212, 214, 216, and 218. Management node 202, however, is not to be construed as being precluded from executing at least a portion of distributed application 204.

Runtime engine 206 and compiler 208 reside on management node 202 in the embodiment depicted in FIG. 4. As described in greater detail with respect to FIGS. 6 and 7, in general, runtime engine 206 and compiler 208 operate to, among other things, respectively (i) deploy and monitor the execution of distributed application 204 within computing environment 200 and (ii) translate source code of distributed application 204 into object code. For example, runtime engine 206 can monitor distributed application 204 as it executes on host nodes 210-218 to generate runtime environment information that can include information identifying each processing element and/or operator executing on each node, information describing resource utilization and/or capacity on each node, and/or information identifying nodes having excess capacity. When distributed application 204 source code is modified such that it is recompiled prior to redeployment within computing environment 200, runtime engine 206 can, as described herein, pass one or more types of runtime environment information to compiler 208 in the form of compiler hints. Compiler 208 can, in various embodiments, utilize compiler hints provided by runtime engine 206 to optimize distributed application 204 to minimize downtime and/or minimize disruption during redeployment, and based on changes made during code optimization, pass runtime engine 206 information describing the changes made to distributed application 204 in the form of compiler-scheduler hints. Compiler-schedule hints provided by compiler 208 to runtime engine 206 are not equivalent to compiler hints that runtime engine 206 provides to compiler 208. Runtime engine 206 utilizes the compiler-scheduler hints to optimize the modification and placement of PEs (e.g., PE1-PE10) and/or operators executing within PEs within computing environment 200 to minimize downtime and/or disruption during redeployment, at least in part, of distributed application 204. An example of PE/operator optimization is described with respect to FIGS. 5A and 5B. Features of runtime engine 206 are described in greater detail with respect to FIG. 7. Features of compiler 208 are described in greater detail with respect to FIG. 6.

Each host node of host node 210, host node 212, host node 214, host node 216, and host node 218 can, in various embodiments, be a standalone device, a server, a laptop computer, a tablet computer, a netbook computer, a personal computer (PC), a desktop computer, a personal digital assistant (PDA), a smart phone, or any programmable electronic device capable of communicating with management node 202 and executing a respective portion of distributed application 204 (e.g., one or more of PE1-PE10). In other embodiments, one or more host nodes of host nodes 210-218 can represent a computing system utilizing clustered computers and components to act as a single pool of seamless resources. In yet other embodiments, one or more host nodes of host nodes 210-218 can represent a virtual machine. In general, host nodes 210-218 can be any collection or combination of physical or virtual computing devices capable of executing respective portion(s) of distributed application 204. In the embodiment, depicted in FIG. 4, for example: host node 210 can represent any combination of computing resources capable of executing and/or facilitating the execution of PE1, PE2, and PE3; host node 212 can represent any combination of computing resources capable of executing and/or facilitating the execution of PE4; host node 214 can represent any combination of computing resources capable of executing and/or facilitating the execution of PE5; host node 216 can represent any combination of computing resources capable of executing and/or facilitating the execution of PE6; and host node 218 can represent any combination of computing resources capable of executing and/or facilitating the execution of PE7, PE8, PE9, PE10. In various embodiments, host nodes 210, 212, 214, 216, and 218 can share one or more computing resources (e.g., persistent storage, memory, networks, etc.). Additionally, host nodes 210-212 can include or utilize internal and external hardware components, as depicted and described in further detail with respect to FIG. 3.

In various embodiments, Network 220 can be a local area network (LAN), a wide area network (WAN) such as the Internet, or a combination of the two, and may include wired, wireless, fiber optic or any other connection known in the art. In general, network can be any combination of connections and protocols that will support communications between management node 202 and each host node of host nodes 210-212 and communications among host node 210-212 to facilitate deployment, monitoring, and/or execution, of distributed application 204 within computing environment 200.

Figure 5A:
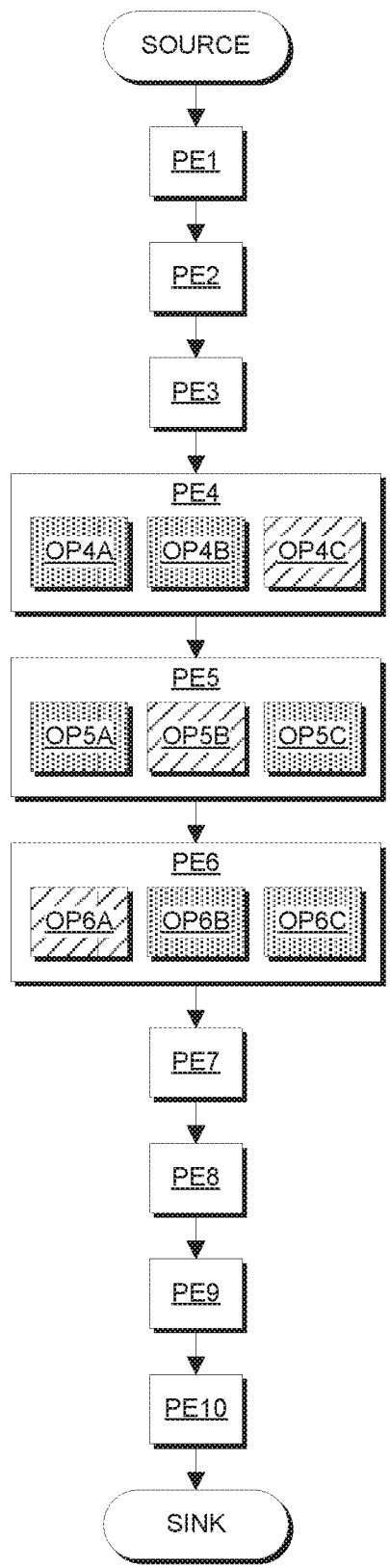
FIG. 5A is a block flow diagram illustrating operations of a distributed data processing application within the computing environment of FIG. 4, in accordance with an embodiment of the present invention.
Figure 5B:
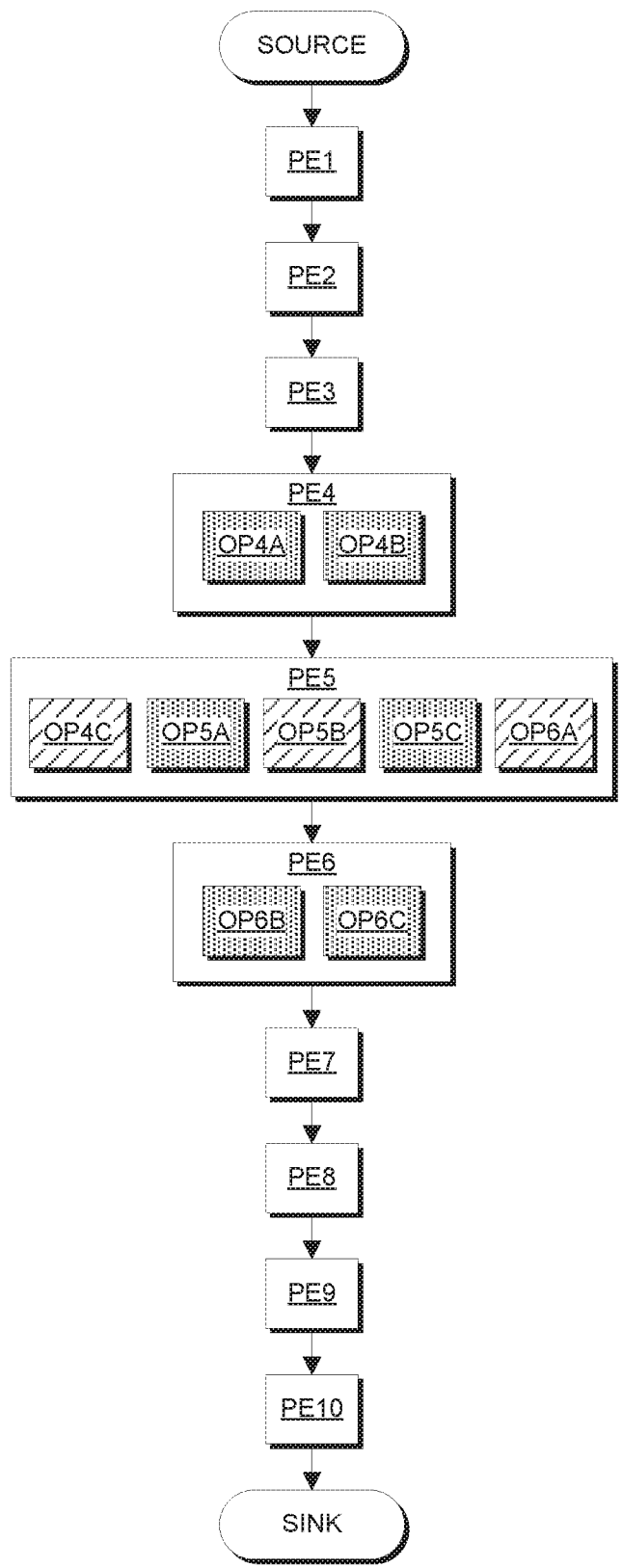
FIG. 5B is a block flow diagram illustrating optimized operations of a distributed data processing application within the computing environment of FIG. 4, in accordance with an embodiment of the present invention.

FIGS. 5A and 5B are block flow diagrams depicting data as it flows from processing element to processing element in an unoptimized and an optimized modified version of a distributed data processing application. More specifically, FIG. 5A depicts an unoptimized flow of tuples from a source, through PE1-PE10 of distributed application 204, as depicted in FIG. 4, and to a sink. FIG. 5B depicts an optimized (i.e., relative to FIG. 5A) flow of tuples from a source, through PE1-PE10 of distributed application 204, as depicted in FIG. 4, and to a sink. FIGS. 5A and 5B depict a linear flow of tuples through PE1-PE10 for illustrative simplicity. Embodiments of the present invention are not to be construed as being limited to a linear flow of data.

In the embodiment depicted in FIG. 5A, each PE of PE1-PE10 includes at least one respective operator that acts on data received by the PE (e.g., filtering, aggregation, various analytical functions, etc.). While FIGS. 5A and 5B depict operators in only PE4, PE5, and PE6, each of PE1, PE2, PE3, PE7, PE8, PE9, and PE10 includes at least one operator. FIGS. 5A and 5B depict operators in PE4, PE5, and PE6 because, in this specific example, PE4, PE5, and PE6 each include a modified operator relative to a previous version of distributed application 204. For example, PE4 includes operator OP4A, operator OP4B, and operator OP4C. Operator OP4C has been modified relative to the previous version of distributed application 204; the different hash pattern of operator OP4C compared to the hash pattern of operators OP4A and OP4B represents the fact that operator OP4C is a modified operator. Processing element PE5 includes operator OP5A, operator OP5B, and operator OP5C. The hash pattern of operator OP5B similarly indicates that operator OP5B has been modified relative to the previous version of distributed application 204. Processing element PE6 includes operator OP6A, operator OP6B, and operator OP6C. The hash pattern of operator OP6A similarly indicates that operator OP6A has been modified relative to the previous version of distributed application 204. In the embodiment depicted in FIGS. 5A and 5B, modifications to distributed application 204 are depicted as modifications to discrete operators and movement of the modified operators among the PEs. In other embodiments, however, modifications to distributed application 204 can be made to blocks of code within individual operators, and in such embodiments, blocks of code can be moved among operators and/or PEs similarly to how operators are shown to move among PEs in FIGS. 5A and 5B. Similarly, two or more PEs can be fused (i.e., combined) into a single PE just as two or more operators can be fused into a single PE, and two or more PEs within a single PE can be unfused (i.e., separated) into two or more PEs just as two or more operators within a single PE can be unfused into two or more PEs.

In redeploying the modified version of distributed application 204 (i.e., as depicted in FIG. 5A), a first optimization is to redeploy only the PEs of distributed application 204 that have been modified. In the embodiment depicted in FIG. 5A, for example, redeploying only PE4, PE5, and PE6 would be advantageous in that only PE4, PE5, and PE6 and/or host node 212, host node 214, and host node 216 will have to terminate and restart to implement the modifications to distributed application 204 while PE1-PE3 executing on host node 210 and PE7-PE10 executing on host node 218 can continue to execute. This first type of optimization is herein referred to as "overlaying" a modified application or "job" on an existing instance of a deployed, distributed application. Overlaying a modified application is therefore advantageous at least in that it reduces downtime and disruption resulting from modifying a currently executing application, which is beneficial in multi-tenant and/or cloud computing environments having SLAs that may impose restrictions, in some cases severe restrictions (e.g., real-time or streaming data processing and security applications), on the permissible amount of downtime.

Embodiments of the present invention, however, recognize that further optimization may be possible to further reduce downtime. More specifically, embodiments of the present invention recognize that modifications to an existing instance of an application can be small relative to the overall code and can affect only a small subset of PEs and/or operators. To further reduce downtime and/or disruption to an existing instance of a distributed application, embodiments or the present invention provide tools for performing a second, further optimization when overlaying a modified application on the existing instance of the application. More specifically, the second optimization identifies how and where the distributed application has been modified and determines whether modified PEs, operators, and/or other functional code elements can be moved to other operators, PEs, and/or nodes to minimize disruptions when overlaying a modified application on an existing instance of the application, as described in greater detail with respect to FIGS. 5B, 6, and 7.

In the embodiment depicted in FIG. 5B, distributed application 204, as depicted in FIG. 5A, is further optimized to reduce downtime and/or disruptions when overlaying the modifications to distributed application 204 on an existing instance of distributed application 204. More specifically, runtime engine 206 and compiler 208 operate, as described with respect to FIGS. 6 and 7, to fuse (i.e., combine) operator OP4C and operator OP6A into PE5. Persons of ordinary skill in the art will therefore understand that PE5, as depicted in FIG. 5B, includes all modified operators while the operators within PE4 and PE6 (i.e., OP4A, OP4B, OP6B, and OP6C) have not been modified with respect to the prior version of distributed application 204. While removing operator OP4C from PE4 and operator OP6A from PE6 can, in some embodiments, require that runtime engine 206 terminate and restart PE4 and PE6 to affect the removal of operators OP4C and OP6A from an existing instance of distributed application 204, persons of ordinary skill in the art will understand that this type of modification generally incurs less downtime and/or disruption than modifying PE4 and PE6 to incorporate the modifications to OP4C and OP6A respectively. In combining operators OP4C, OP5A, and OP5B, OP5C, and OP6A in PE5, the amount of time required to restart and reinitialize PE5 may be extended compared to PE5 as depicted in FIG. 5A; PE4 and PE6 (and/or their respective nodes), however, will generally restart and reinitialize more quickly compared to PE4 and PE6 as depicted in FIG. 5A and therefore reduce the "overall" or "effective" downtime, or more generally reduce disruption, associated with overlaying the modifications to distributed application 204 because PE4 and PE6 can begin processing data more quickly.

Figure 6:
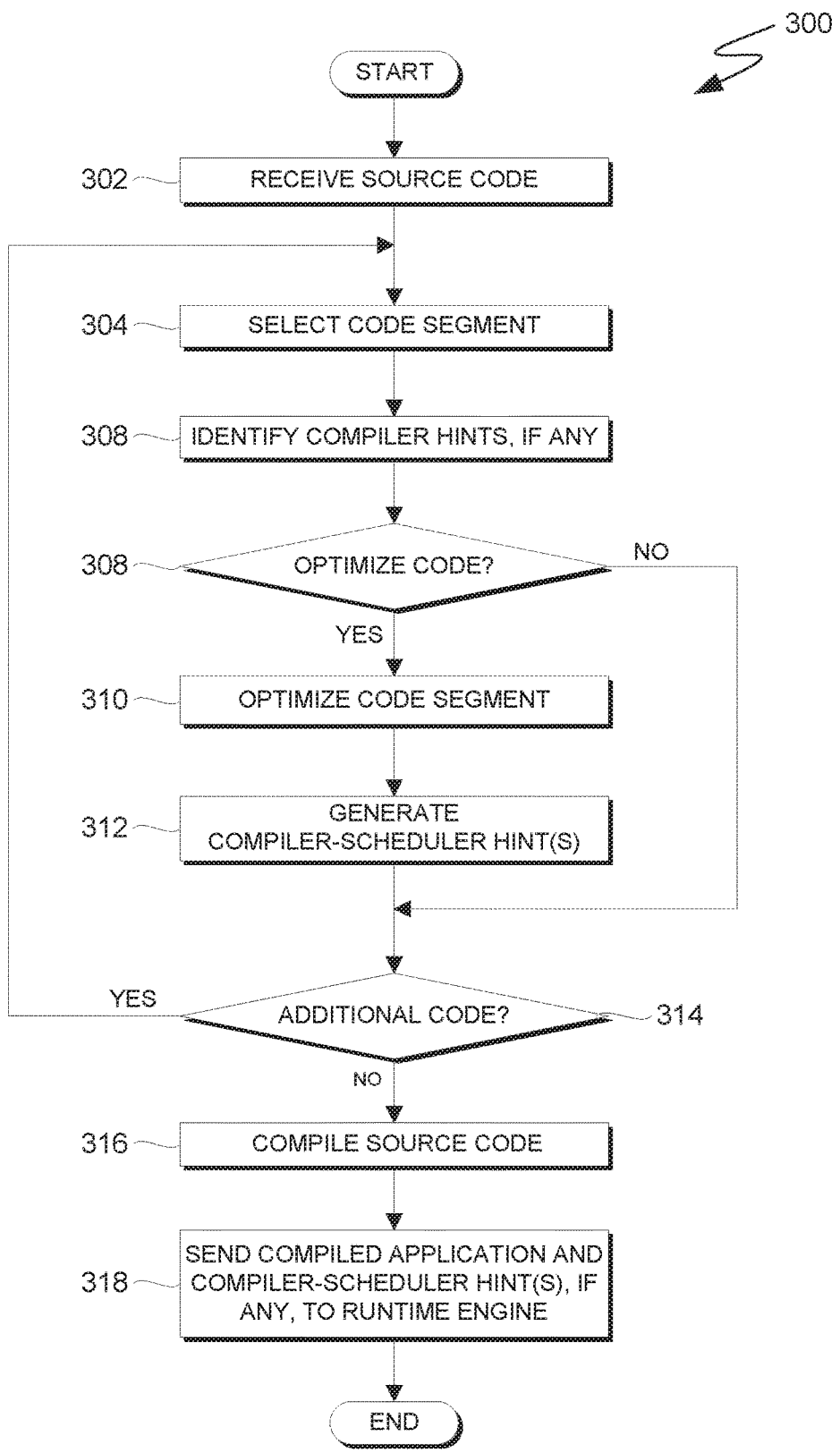
FIG. 6 is a flowchart illustrating operations of a compiler for optimizing updates to distributed data processing applications, on a computing device within the computing environment of FIG. 4, in accordance with an embodiment of the present invention.

FIG. 6 is a flowchart depicting operations for optimizing updates to a distributed data processing application, on a computing device within the computing environment of FIG. 4, in accordance with an embodiment of the present invention. For example, FIG. 6 is a flowchart depicting operations 300 of compiler 208 within computing environment 200 of FIG. 4. In general, operations 300 of compiler 208 operate to translate high-level application code into lower-level application code (e.g., translate source code to object code). Additionally, operations 300 optimize the compiled code based on changes to the application code compared to previous version(s) of the application code and/or runtime environment information.

Operations 300 are initiated when compiler 208 receives source code representing a distributed data processing application (e.g., distributed application 204; operation 302). Compiler 208 selects segments of code (operation 304), identifies any compiler hints provided by runtime engine 206 (as described with respect to FIG. 7; operation 306) and determines whether compiler 208 can optimize the application code to facilitate reallocation of functional code elements (e.g., operators or subset(s) of operators) among PEs (decision 308). In some embodiments, compiler 208 selects at least one complete function (e.g., operator) for optimization analysis (operation 304). Persons of ordinary skill in the art will understand that compilers can optimize code in various ways (e.g., modifying loops, conditional statements, and recursive function) to reduce the size of the code and increase the speed at which the code executes compared to a literal translation of a higher-level programming language. Optimized code is generally considered to be functionally equivalent to the code written in the higher-level programming language. Embodiments of the present invention realize an improvement in compiler optimization with respect to distributed data processing applications by incorporating runtime information and/or environment information into the compiler optimization process to reduce the impact of overlaying a distributed application over an existing instance of the distributed application. In the embodiment depicted in FIG. 6, compiler 208 obtains runtime information and/or environment information in the form of compiler hints (operation 306). In general, compiler hints represent various types of annotations made in a higher-level programming language such that compiler 208 will interpret the annotations as compiler hints. Persons of ordinary skill in the art will understand that the format of compiler hints and the types of information that can be communicated to a compiler will vary based on the higher-level programming language in use. Embodiments of the present invention utilize a high-level programming language for distributed application 204 that supports the capabilities described with respect to compiler 208 and runtime engine 206. As further described with respect to FIG. 7, in various embodiments of the present invention a compiler hint can identify a specific change in the code, a specific type of change in the code, where in the code a change occurs, and/or identify the PE(s) and/or operator(s) associated with a change in the code.

In addition to utilizing the identified compiler hints, if any, to determine whether compiler 208 can optimize the code to reduce the impact of overlaying a distributed application over an existing instance of the distributed application (operation 308), compiler 208 can utilize the behavior of functions within the code to determine whether a functional code element (e.g., an operator) can be moved elsewhere in the code to optimize the code. In some embodiments, compiler 208 utilizes three categories of functions to evaluate changes in the code: (i) functions that can, in essence, be processed anywhere within the code (e.g., logging functions, print functions, etc.); (ii) functions that mutate data and must occur in a specific order such that dependent functions must remain downstream (e.g., changing an attribute float forecast_value); and (iii) functions that do not mutate data in anyway and can, in essence, be moved within the code so long as their order with respect to any mutable function on which they depend is maintained. Using such a three-category system, for example, persons of ordinary skill in the art will understand that compiler 208 can determine if and how compiler 208 can order various functional elements within the code to optimize the code in conjunction with the compiler hints. In some embodiments, various types of compiler hints identify functions in accordance with the aforementioned three-category system.

If compiler 208 can optimize the selected code segment to reduce the impact of overlaying a distributed application over an existing instance of the distributed application (decision 308, YES branch), compiler optimizes the selected code segment (operation 310). In general, compiler 208 optimizes the code by determining how to order functional elements (e.g., operators) within the code to minimize the overall disruptions associated with overlaying the distributed application on the existing instance. In some embodiments, the optimization clusters modified and/or new functions relative to previous version(s) of the code to the extent permitted by the code (e.g., functions that mutate data and functions that do not mutate data). With respect to the embodiment depicted FIGS. 5A and 5B, compiler 208 can facilitate the optimization depicted in FIG. 5B by placing code related to operators OP4C, OP5A, OP5B, OP5C, and OP6A in an order that facilitates the deployment of each within PE5 by runtime engine 206. Because it can be difficult or impossible to move functions that mutate data within the code, in general, it is advantageous for compiler 208 to cluster (i) modified functions that can be processed anywhere within the code and (ii) modified functions that do not mutate data about modified functions that mutate data to the extent permitted by such functions. In embodiments in which the compiler hints identify the PEs associated with changes in the code, it is also advantageous to order modified functions within the code to facilitate deployment of the modified code (e.g., via runtime engine 206) on a minimum number of PEs (e.g., as described with respect to FIGS. 5A and 5B) to reduce the number of PEs that must restart. In some embodiments, the placement of any one code segment and/or function may change as compiler 208 iterates through operations 300 with respect to other parts of the code (e.g., performing subsequent iterations of operations 304-314).

Based on the optimized code segment, compiler 208 generates one or more compiler-scheduler hints (operation 312). Additionally, in some embodiments, one or more developers may inject compiler-scheduler hints into the source code to further help compiler 208 reduce downtime when redeploying applications. Persons of ordinary skill in the art will readily understand that various forms of annotations are widely used in respective programming languages. In general, compiler-scheduler hints are annotations to the compiled program that are interpretable by runtime engine 206 and that describe, at least in part, optimizations performed by compiler 208 to reduce the impact of overlaying the distributed application over the existing instance of the distributed application. For example, a compiler-scheduler hint can identify a specific function that is reordered (i.e., moved with respect to a previous version of the code) within the optimized code, identify the function type of a reordered function, identify where a reordered function appears within the code, and/or identify PE(s) and/or operator(s) associated with a reordered function. In another example, a compiler-scheduler hint identifies an operation on the data that is known to have no impact on downstream processing, such as a test function.

Figure 7:
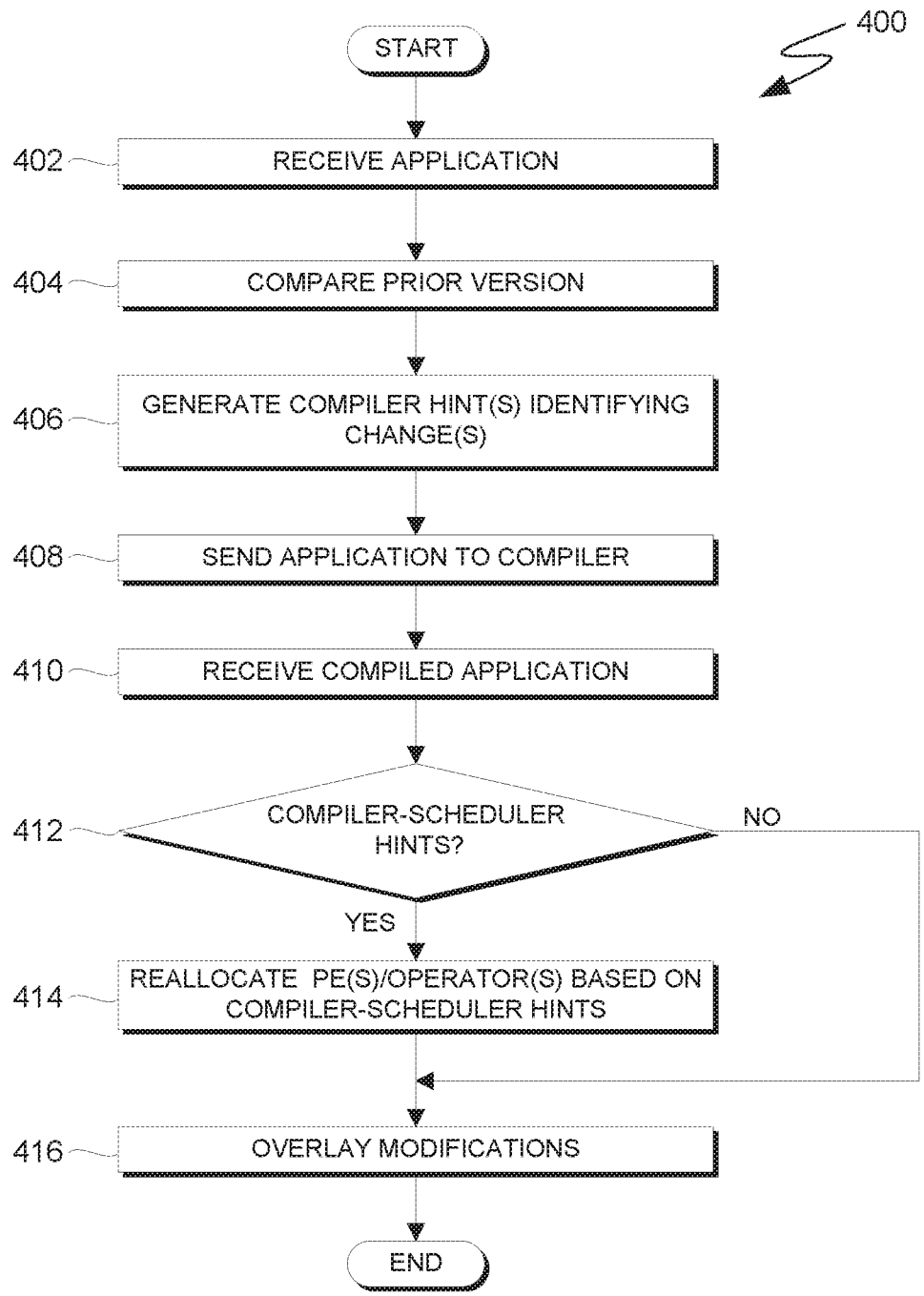
FIG. 7 is a flowchart illustrating operations of a runtime engine for optimizing updates to distributed data processing applications, on a computing device within the computing environment of FIG. 4, in accordance with an embodiment of the present invention.

As described with respect to FIG. 7, compiler-scheduler hints are used by runtime engine 206 to minimize disruption and the number of PEs and/or nodes that must restart when overlaying the distributed application over the existing instance of the distributed application.

In the embodiment depicted in FIG. 6, the decision of whether compiler 208 can optimize the code (decision 308) is made, at least in part, with respect to optimizations that can be performed based on the runtime information and/or environment information embodied by any compiler hints. If compiler 208 determines that it cannot optimize the selected code segment (decision 308, NO branch), compiler 208 can, in some embodiments, make other forms of optimization not dependent on the runtime information and/or environment information. In embodiments in which compiler 208 performs optimizations that are not dependent on the runtime information and/or environment information, compiler 208 can execute multiple optimization operations on the selected code segment in which various factors, such as minimal overlay downtime, receive respective weighting values that enable compiler 208 to balance competing objectives. In general, compiler 208 performs iterations of operation 304-314 (i.e., optimization cycles; decision 314, YES branch) until compiler 208 has fully analyzed the received source code. In some embodiments, compiler 208 performs optimization cycles on only the portions of the received source code that are modified relative to previous version(s) of the source code (e.g., as identified by compiler hint(s)) or that are affected by such modifications. In other embodiments, compiler 208 performs optimization cycles on the entirety of the received source code. If compiler 208 determines that there is no additional code to optimize (decision 314, NO branch), compiler 208 compiles the received source code, or at least the modified portions (operation 316), and sends the compiled application (e.g., in a .SAB file format) and the compiler-scheduler hint(s), if any, to runtime engine 206 (operation 318).

FIG. 7 is a flowchart depicting operations for optimizing updates to a distributed data processing application, on a computing device within the computing environment of FIG. 4, in accordance with an embodiment of the present invention. For example, FIG. 7 is a flowchart depicting operations 400 of runtime engine 206 within computing environment 200 of FIG. 4. In general operations 400 of runtime engine 206 operate to overlay modifications to distributed application 204 on the instance of distributed application 204 already deployed on host nodes 210, 212, 214, 216, and 218 in an efficient manner.

Persons of ordinary skill in the art should understand that some instances of a distributed application can be represented as a bundled set of compiled applications. For example, in some embodiments, one or more processing elements (e.g., PE1-PE10) and/or one or more operators referenced herein may represent respective, smaller compiled applications within a larger distributed application (e.g., distributed application 204). In such embodiments, the optimization performed by runtime engine 206 (e.g., operations 400 as described with respect to FIG. 7) and/or compiler 208 (e.g., operations 300 as described with respected to FIG. 6) can occur across the larger distributed applications (e.g., distributed application 204), as described with respect to FIGS. 5A and 5B, or similarly within a smaller compiled application (e.g., one or more of PE1-PE10 representing a discrete, compiled application). In embodiments where a distributed application comprises a set of compiled applications distributed among a plurality of host nodes (e.g., host nodes 210, 212, 214, 216, and 218), optimizing the deployment of the distributed application can include redistributing compiled applications among the plurality of host nodes and/or redistributing PEs and/or operators among the compiled applications based on operations 300 and 400. Accordingly, various embodiments of the preset invention provide optimization of a distributed application comprised of a set of smaller compiled applications/programs. The present inventions is not to be construed as being limited to a distributed application consisting of a single compiled application/program.

Operations 400 are initiated when runtime engine 206 receives a modified version of a distributed data processing application for deployment within computing environment 200 (e.g., from a developer via a user interface of management node 202; operation 402). Runtime engine 206 identifies at least a most recent prior version of the application (e.g., a version of the application presently deployed within computing environment 200) and compares the received, modified version of the application (i.e., a new version of the distributed application) to the identified prior version(s) of the application (e.g., existing .SAB file(s) or prior version(s) of source code; operation 404) to identify change(s) made relative to the prior version(s). For at least a subset of the changes, runtime engine 206 generates respective compiler hints (operation 406). In some embodiments, some changes may not correspond to a type of compiler hint because, for example, they are inconsequential enough to be ignored. As described with respect to FIG. 6, in general, compiler hints represent various types of annotations made in a higher-level programming language such that compiler 208 will interpret the annotations as compiler hints. A compiler hint can identify a specific change in the code, a specific type of change in the code, where in the code a change occurs, or identify the PE(s) and/or operator(s) associated with a change in the code. Any one change in the code can have one or more compiler hints associated with the change. Runtime engine 206 sends the modified application (e.g., the modified source code) and any compiler hints to compiler 208 (operation 408). Compiler 208 executes operations 300 on the modified application in accordance with the generated compiler hints and various optimization parameters, as described with respect to FIG. 6. Runtime engine 206 receives the output of operations 300 of compiler 208 (operation 410).

If runtime engine 206 receives any compiler-scheduler hint(s) from compiler 208 (decision 412, YES branch), runtime engine 206 reallocates code among operators, operators among PEs, and/or PEs among PEs based, at least in part, on the compiler-scheduler hint(s) to minimize downtime and/or disruption (e.g., a number of PEs and/or nodes that must restart) incurred as a result of overlaying the modifications to the distributed application on the existing instance of the distributed application (operation 414), as described with respect to FIGS. 5A and 5B. As described with respect to FIG. 6, in general, compiler-scheduler hints are annotations to the compiled program that are interpretable by runtime engine 206 and that describe, at least in part, optimizations performed by compiler 208 to reduce the impact of overlaying the distributed application over the existing instance of the distributed application. A compiler-scheduler hint can identify a specific function that is reordered (i.e., moved with respect to a previous version of the code) within the optimized code, identify the function type of a reordered function, identify where a reordered function appears within the code, and/or identity PE(s) and/or operator(s) associated with a reordered function.

In addition to the compiler-scheduler hints, runtime engine 206 analyzes runtime and computing environment information including the available host nodes and the computing resources that are available on each host node, among other factors, to determine an optimal arrangement of PE(s) and/or operators to minimize startup time/down time and/or disruption when the modifications are overlaid on the existing instance of the distributed application. As described with respect to FIGS. 5A and 5B, it is advantageous to allocate operator(s) and/or PEs such that (i) the minimum number of PE(s) and/or nodes must terminate, restart, and reinitialize; and (ii) modified or new operators and PEs are fused (i.e., combined) into shared PE(s) or onto shared node(s). In FIG. 5B, for example, combining operators OP4C, OP5A, OP5B, OP5C, and OP6A into PE5, which is the sole PE executing on host node 214, enables PE4 and PE6 to restart and initialize faster than in the embodiment depicted in FIG. 5A, which can advantageously minimize the "overall" or effective downtime and/or disruption to the system. Initialization of PEs, operators, and/or compiled applications can include initialization of the code; re-establishing socket connections to other compiled applications, PEs, and/or operators; accessing one or more databases; and/or opening one or more files, among various other initialization activities known in the art. While compiler 208 may determine that the provisioning of PE5 as depicted in FIG. 5B is optimal, in some embodiments runtime engine 206 may determine that host node 214 does not have sufficient computing resources to support operations of OP4C, OP5A, OP5B, OP5C, and OP6A. In such cases, runtime engine 206 can utilize runtime and computing environment information to allocate operator(s) among PEs, for example, and/or PEs among nodes (e.g., host nodes 210, 212, 214, 216, and 218) based on the available computing resources (e.g., processor, memory, network, and/or storage capacities) to minimize downtime and disruptions when the modifications are overlaid on the existing instance of the distributed application. In addition, runtime engine 206, in some embodiments, can utilize runtime and environment information to optimize the distribution of PE(s) among the available host nodes if runtime engine 206 does not receive any compiler-scheduler hints from compiler 208 (decision 412, NO branch). Runtime engine 206 overlays the modification(s) to the distributed application onto the existing instance of the distributed application based on the optimizations performed by runtime engine 206 and/or compiler 208 (operation 416), as described herein.

What is claimed is:

1. A method for optimizing updates to a distributed data processing application, the method comprising:

comparing, by a runtime engine, a first version of a distributed application to a second version of the distributed application, the second version representing a new version of the distributed application;

generating, by the runtime engine, one or more compiler hints for at least one change, each compiler hint describing an aspect of a respective change;

sending, by the runtime engine, the second version of the distributed application and the one or more compiler hints to a compiler;

receiving from the compiler, by the runtime engine, a compiled second version of the distributed application and at least one compiler-scheduler hint, each compiler-scheduler hint describing a respective optimization made by the compiler to the compiled second version of the distributed application based, at least in part, on the at least one change made to the first version of the distributed application and the one or more compiler hints; and overlaying, by the runtime engine, the at least one change made to the first version of the distributed application based, at least in part, on the at least one compiler-scheduler hint and the compiled second version of the distributed application, wherein the at least one compiler-scheduler hint is upgrading the overlay by regrouping a plurality of operators within the first version of the distributed application that identify, reallocate, and restart a plurality of processing elements within the first version of the distributed application by identifying the plurality of processing elements associated with the at least one change in the compiled second version of the distributed application, reallocating the plurality of operators to the plurality of processing elements associated with the compiled second version of the distributed application, and minimizing a downtime associated with the overlay of the at least one change over the first version of the distributed application.

2. The method of claim 1, wherein overlaying, by the runtime engine, the at least one change made to the first version of the distributed application based, at least in part, on the at least one compiler-scheduler hint and the compiled second version of the distributed application further comprises:

identifying, by the runtime engine, a first processing element executing at least a first operator and a second processing element executing at least a second operator, the first operator and the second operator (i) including respective changes made to the first version of the distributed application and (ii) representing code executing on an instance of the first version of the distributed application that is deployed in a distributed computing environment;

reallocating, by the runtime engine, the first operator to the second processing element based, at least in part, on a compiler-scheduler hint representing an optimization made by the compiler with respect to code representing the first operator; and restarting, by the runtime engine, the first processing element and the second processing element, wherein reallocating the first operator to the second processing element minimizes downtime required to overlay the respective changes made to the first version of the distributed application and included in the first and second operator.

3. The method of claim 2, wherein reallocating the first operator to the second processing element reduces a count of processing elements that the runtime engine restarts to overlay the at least one change made to the first version of the distributed application.

4. The method of claim 2, wherein reallocating the first operator to the second processing element reduces a count of nodes that the runtime engine restarts to overlay the at least one change made to the first version of the distributed application, a plurality of nodes hosting respective processing elements of a plurality of processing elements that includes the first processing element and the second processing element.

5. The method of claim 2, wherein the runtime engine reallocates the first operator to the second processing element based at least in part on runtime information and computing environment information describing the instance of the first version of the distributed application that is deployed in the distributed computing environment.

6. The method of claim 2, further comprising:

identifying, by the compiler, the respective changes made to the first version of the distributed application in the first operator and the second operator based, at least in part, on respective compiler hints;

reordering, by the compiler, code representing the respective changes made to the first version of the distributed application in the first operator and the second operator to optimize the second version of the distributed application by generating compiled code that permits the runtime engine to minimizing downtime when overlaying the at least one change made to the first version of the distributed application; and generating, by the compiler, one or more compiler-scheduler hints that describe, at least in part, the reordering of the code representing the respective changes made to the first version of the distributed application in the first operator and the second operator.

7. The method of claim 1, wherein the distributed application is a streaming data processing application.

8. The method of claim 7, wherein the streaming data processing application executes within a cloud computing environment.

9. A computer program product for optimizing updates to a distributed data processing application, the computer program product comprising:

a computer readable storage medium and program instructions stored on the computer readable storage medium, the program instructions comprising:

program instructions to compare, by a runtime engine, a first version of a distributed application to a second version of the distributed application, the second version representing a new version of the distributed application;

program instructions to generate, by the runtime engine, one or more compiler hints for at least one change, each compiler hint describing an aspect of a respective change;

program instructions to send, by the runtime engine, the second version of the distributed application and the one or more compiler hints to a compiler;

program instruction to receive from the compiler, by the runtime engine, a compiled second version of the distributed application and at least one compiler-scheduler hint, each compiler-scheduler hint describing a respective optimization made by the compiler to the compiled second version of the distributed application based, at least in part, on the at least one change made to the first version of the distributed application and the one or more compiler hints; and program instructions to overlay, by the runtime engine, the at least one change made to the first version of the distributed application based, at least in part, on the at least one compiler-scheduler hint and the compiled second version of the distributed application, wherein program instructions of the at least one compiler-scheduler hint is upgrading the overlay by regrouping a plurality of operators within the first version of the distributed application that identify, reallocate, and restart a plurality of processing elements within the first version of the distributed application by identifying the plurality of processing elements associated with the at least one change in the compiled second version of the distributed application reallocating the plurality of operators to the plurality of processing elements associated with the compiled second version of the distributed application, and minimizing a downtime associated with the overlay of the at least one change over the first version of the distributed application.

10. The computer program product of claim 9, wherein the program instructions to overlay, by the runtime engine, the at least one change made to the first version of the distributed application based, at least in part, on the at least one compiler-scheduler hint and the compiled second version of the distributed application further comprise:
program instructions to identify, by the runtime engine, a first processing element executing at least a first operator and a second processing element executing at least a second operator, the first operator and the second operator (i) including respective changes made to the first version of the distributed application and (ii) representing code executing on an instance of the first version of the distributed application that is deployed in a distributed computing environment;
program instructions to reallocate, by the runtime engine, the first operator to the second processing element based, at least in part, on a compiler-scheduler hint representing an optimization made by the compiler with respect to code representing the first operator; and
program instructions to restart, by the runtime engine, the first processing element and the second processing element, wherein reallocating the first operator to the second processing element minimizes downtime required to overlay the respective changes made to the first version of the distributed application and included in the first and second operator.

11. The computer program product of claim 10, wherein the program instructions to reallocate the first operator to the second processing element reduces a count of processing elements that the runtime engine restarts to overlay the at least one change made to the first version of the distributed application.

12. The computer program product of claim 10, wherein the program instructions to reallocate the first operator to the second processing element reduces a count of nodes that the runtime engine restarts to overlay the at least one change made to the first version of the distributed application, a plurality of nodes hosting respective processing elements of a plurality of processing elements that includes the first processing element and the second processing element.

13. The computer program product of claim 10, wherein the program instructions to reallocate, by the runtime engine, the first operator to the second processing element reallocate the first operator to the second processing element based at least in part on runtime information and computing environment information describing the instance of the first version of the distributed application that is deployed in the distributed computing environment.

14. The computer program product of claim 10, the program instructions further comprising:
program instructions to identify, by the compiler, the respective changes made to the first version of the distributed application in the first operator and the second operator based, at least in part, on respective compiler hints;
program instructions to reorder, by the compiler, code representing the respective changes made to the first version of the distributed application in the first operator and the second operator to optimize the second version of the distributed application by generating compiled code that permits the runtime engine to minimizing downtime when overlaying the at least one change made to the first version of the distributed application; and
program instructions to generate, by the compiler, one or more compiler-scheduler hints that describe, at least in part, the reordering of the code representing the respective changes made to the first version of the distributed application in the first operator and the second operator.

15. A computer system for optimizing updates to a distributed data processing application, the computer system comprising:
one or more computer processors;
one or more computer readable storage media;
program instructions stored on the one or more computer readable storage media for execution by at least one of the one or more processors, the program instructions comprising:
program instructions to compare, by a runtime engine, a first version of a distributed application to a second version of the distributed application, the second version representing a new version of the distributed application;
program instructions to generate, by the runtime engine, one or more compiler hints for at least one change, each compiler hint describing an aspect of a respective change;
program instructions to send, by the runtime engine, the second version of the distributed application and the one or more compiler hints to a compiler;
program instruction to receive from the compiler, by the runtime engine, a compiled second version of the distributed application and at least one compiler-scheduler hint, each compiler-scheduler hint describing a respective optimization made by the compiler to the compiled second version of the distributed application based, at least in part, on the at least one change made to the first version of the distributed application and the one or more compiler hints; and
program instructions to overlay, by the runtime engine, the at least one change made to the first version of the distributed application based, at least in part, on the at least one compiler-scheduler hint and the compiled second version of the distributed application, wherein program instructions of the at least one compiler-scheduler hint is upgrading the overlay by regrouping a plurality of operators within the first version of the distributed application that identify, reallocate, and restart a plurality of processing elements within the first version of the distributed application by identifying the plurality of processing elements associated with the at least one change in the compiled second version of the distributed application, reallocating the plurality of operators to the plurality of processing elements associated with the compiled second version of the distributed application, and minimizing a downtime associated with the overlay of the at least one change over the first version of the distributed application.

16. The computer system of claim 15, wherein the program instructions to overlay, by the runtime engine, the at least one change made to the first version of the distributed application based, at least in part, on the at least one compiler-scheduler hint and the compiled second version of the distributed application further comprise:
  program instructions to identify, by the runtime engine, a first processing element executing at least a first operator and a second processing element executing at least a second operator, the first operator and the second operator (i) including respective changes made to the first version of the distributed application and (ii) representing code executing on an instance of the first version of the distributed application that is deployed in a distributed computing environment;
  program instructions to reallocate, by the runtime engine, the first operator to the second processing element based, at least in part, on a compiler-scheduler hint representing an optimization made by the compiler with respect to code representing the first operator; and
  program instructions to restart, by the runtime engine, the first processing element and the second processing element, wherein reallocating the first operator to the second processing element minimizes downtime required to overlay the respective changes made to the first version of the distributed application and included in the first and second operator.

17. The computer system of claim 16, wherein the program instructions to reallocate the first operator to the second processing element reduces a count of processing elements that the runtime engine restarts to overlay the at least one change made to the first version of the distributed application.

18. The computer system of claim 16, wherein the program instructions to reallocate the first operator to the second processing element reduces a count of nodes that the runtime engine restarts to overlay the at least one change made to the first version of the distributed application, a plurality of nodes hosting respective processing elements of a plurality of processing elements that includes the first processing element and the second processing element.

19. The computer system of claim 16, wherein the program instructions to reallocate, by the runtime engine, the first operator to the second processing element reallocate the first operator to the second processing element based at least in part on runtime information and computing environment information describing the instance of the first version of the distributed application that is deployed in the distributed computing environment.

20. The computer system of claim 16, the program instructions further comprising:
  program instructions to identify, by the compiler, the respective changes made to the first version of the distributed application in the first operator and the second operator based, at least in part, on respective compiler hints;
  program instructions to reorder, by the compiler, code representing the respective changes made to the first version of the distributed application in the first operator and the second operator to optimize the second version of the distributed application by generating compiled code that permits the runtime engine to minimizing downtime when overlaying the at least one change made to the first version of the distributed application; and
  program instructions to generate, by the compiler, one or more compiler-scheduler hints that describe, at least in part, the reordering of the code representing the respective changes made to the first version of the distributed application in the first operator and the second operator.

* * * * *